United States Patent
Habu

(10) Patent No.: US 7,109,605 B2
(45) Date of Patent: Sep. 19, 2006

(54) ELECTRIC LOAD APPARATUS, METHOD FOR PROCESSING ABNORMALITY, AND COMPUTER READABLE RECORDING MEDIUM RECORDING PROGRAM FOR CAUSING COMPUTER TO EXECUTE PROCESSING OF ABNORMALITY IN ELECTRIC LOAD APPARATUS

(75) Inventor: Masakazu Habu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/512,677

(22) PCT Filed: Jul. 16, 2003

(86) PCT No.: PCT/JP03/09057

§ 371 (c)(1),
(2), (4) Date: Oct. 27, 2004

(87) PCT Pub. No.: WO2004/027969

PCT Pub. Date: Apr. 1, 2004

(65) Prior Publication Data

US 2005/0162023 A1    Jul. 28, 2005

(30) Foreign Application Priority Data

Sep. 17, 2002   (JP) .............................. 2002-269573

(51) Int. Cl.
  *H02J 3/00*   (2006.01)
  *H02J 1/00*   (2006.01)
  *H02P 1/04*   (2006.01)
(52) U.S. Cl. .......................... 307/39; 307/39; 318/430
(58) Field of Classification Search ................ 318/430; 307/38, 39
See application file for complete search history.

(56) References Cited

U.S. PATENT DOCUMENTS

| | | | | |
|---|---|---|---|---|
| 5,304,912 A | * | 4/1994 | Kajiwara et al. | 318/802 |
| 5,368,116 A | * | 11/1994 | Iijima et al. | 180/65.4 |
| 5,373,195 A | | 12/1994 | De Doncker et al. | |
| 5,481,460 A | * | 1/1996 | Masaki et al. | 701/50 |
| 5,549,172 A | * | 8/1996 | Mutoh et al. | 180/65.1 |
| 5,712,540 A | * | 1/1998 | Toda et al. | 318/46 |
| 5,973,463 A | * | 10/1999 | Okuda et al. | 318/430 |
| 6,153,993 A | * | 11/2000 | Oomura et al. | 318/434 |
| 6,288,505 B1 | * | 9/2001 | Heinzmann et al. | 318/139 |
| 6,445,151 B1 | * | 9/2002 | Nakano et al. | 318/434 |
| 6,486,632 B1 | * | 11/2002 | Okushima et al. | 318/599 |
| 6,518,736 B1 | * | 2/2003 | Sasaki et al. | 322/16 |
| 6,608,396 B1 | * | 8/2003 | Downer et al. | 290/40 C |
| 6,710,564 B1 | * | 3/2004 | Shibuya et al. | 318/439 |
| 6,838,839 B1 | * | 1/2005 | Goto et al. | 318/139 |
| 6,930,460 B1 | * | 8/2005 | Ishikawa et al. | 318/442 |
| 6,932,279 B1 | * | 8/2005 | Burcham | 239/222.17 |

(Continued)

FOREIGN PATENT DOCUMENTS

JP    A 6-80048    3/1994

(Continued)

*Primary Examiner*—Lynn Feild
*Assistant Examiner*—Michael Rutland-Wallis
(74) *Attorney, Agent, or Firm*—Oliff & Berridge, PLC

(57) ABSTRACT

Control apparatus (30) forcefully stops inverter (14) and inverter (31) when DC/DC converter (12) is anomalously stopped. Additionally, when one of inverters (14, 31) is anomalously stopped while DC/DC converter (12) is normal, control apparatus (30) forcefully stops the other inverter. Then, when a recovery condition is satisfied after the other inverter is forcefully stopped, control apparatus (30) recovers the other inverter.

12 Claims, 5 Drawing Sheets

U.S. PATENT DOCUMENTS

| | | |
|---|---|---|
| 2003/0067278 A1 | 4/2003 | Nakamura et al. |
| 2003/0081440 A1 | 5/2003 | Komatsu et al. |
| 2004/0145338 A1 | 7/2004 | Nakamura et al. |

FOREIGN PATENT DOCUMENTS

| | | |
|---|---|---|
| JP | A 6-141535 | 5/1994 |
| JP | A 7-15948 | 1/1995 |
| JP | A 9-255255 | 9/1997 |
| JP | A 10-304695 | 11/1998 |
| JP | A 2000-166012 | 6/2000 |
| JP | A 2001-16701 | 1/2001 |
| JP | A 2001-352674 | 12/2001 |
| JP | A 2001-352765 | 12/2001 |

* cited by examiner

F I G. 5
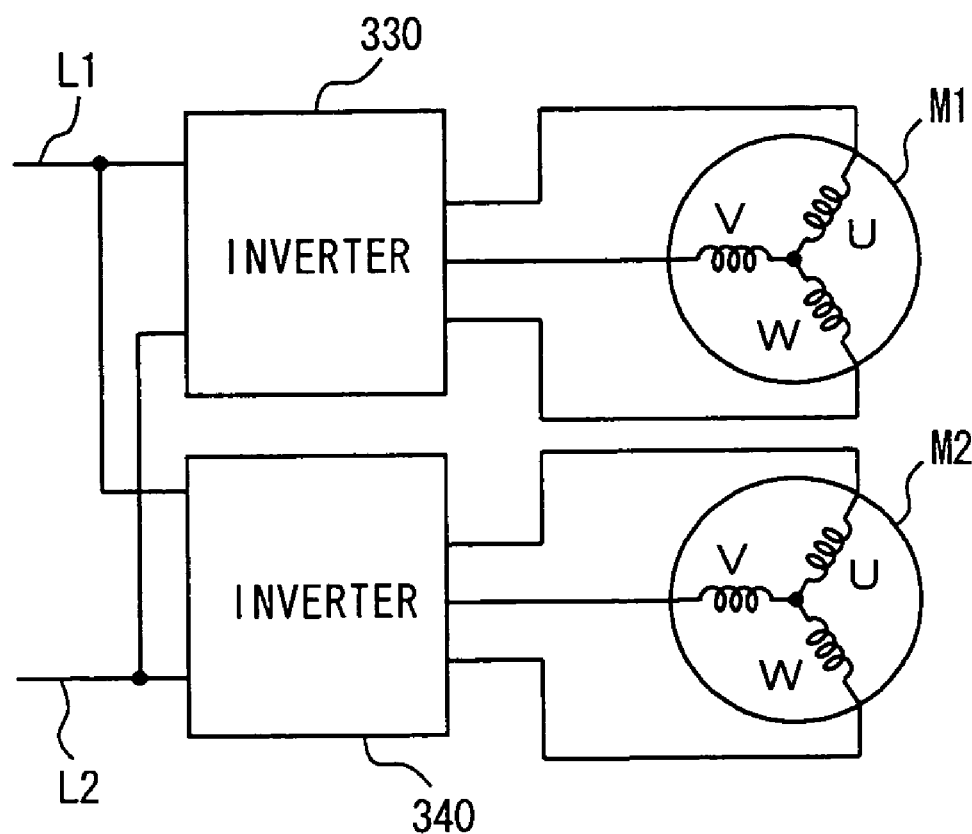

ELECTRIC LOAD APPARATUS, METHOD FOR PROCESSING ABNORMALITY, AND COMPUTER READABLE RECORDING MEDIUM RECORDING PROGRAM FOR CAUSING COMPUTER TO EXECUTE PROCESSING OF ABNORMALITY IN ELECTRIC LOAD APPARATUS

The present invention relates to an electric load apparatus processing a detected abnormality, a method for processing an abnormality in the electric load apparatus, and a computer readable recording medium recording a program for causing a computer to execute processing of an abnormality in an electric load apparatus.

BACKGROUND

Recently, hybrid vehicles are widely attracting attention as environment-friendly vehicles. The hybrid vehicles have partly been brought into practical use.

The hybrid vehicle is powered by a DC (Direct Current) power source, an inverter, and a motor driven by the inverter, in addition to a conventional engine. Specifically, while it is powered by driving the engine, it is also powered by converting DC voltage from the DC power source to AC (Alternating Current) voltage by the inverter and rotating the motor by the converted AC voltage.

Among such hybrid vehicles, a hybrid vehicle equipped with two AC motors M1 and M2 as shown in FIG. 5 can be found. AC motor M1 is a motor for producing torque for driving the driving wheels of the hybrid vehicle. AC motor M2 is a motor connected to the engine of the hybrid vehicle and generates electric power by the rotation of the engine at regenerative braking of the hybrid vehicle.

Inverter 330 receives a predetermined DC voltage from a positive bus L1 and a negative bus L2, and converts the received predetermined DC voltage to AC voltage based on a control signal from a control apparatus (not shown), and drives AC motor M1. Inverter 340 converts AC voltage generated by AC motor M2 to DC voltage based on a control signal from a control apparatus (not shown), and supplies the converted DC voltage to positive bus L1 and negative bus L2. DC voltage supplied to positive bus L1 and negative bus L2 is supplied to inverter 330, or it may be used to charge a DC power source (not shown).

In a hybrid vehicle equipped with such two AC motors M1 and M2, when one of two AC motors M1 and M2 is stopped due to failure or the like, it is a critical issue how to control the other AC motor for the safe driving of the hybrid vehicle.

From such a viewpoint, when one of two AC motors M1 and M2 mounted on a hybrid vehicle is stopped due to failure or the like, generally the other AC motor is stopped. Specifically, when one of the AC motors stops, the other AC motor stops as well.

However, among hybrid vehicles or electric vehicles, some hybrid vehicles are each equipped with a system for boosting DC voltage from DC power source and supplying the boosted DC voltage to two inverters driving two AC motors. In the technique disclosed in Japanese Patent Laying-Open No. 2000-166012, there exist a problem in such a system with a voltage converter for boosting DC voltage, that when one of the AC motors stops, the other AC motor cannot practically be controlled.

SUMMARY

Therefore, an object of the present invention is to provide an electric load apparatus including two AC motors driven by boosted voltage obtained by boosting DC voltage, and capable of processing a detected abnormality.

Another object of the present invention is to provide a method for processing an abnormality in an electric load apparatus including two AC motors driven by boosted voltage obtained by boosting DC voltage.

Still another object of the present invention is to provide a computer readable recording medium recording a program for causing a computer to execute processing of an abnormality in an electric load apparatus including two AC motors driven by boosted voltage obtained by boosting DC voltage.

According to the present invention, an electric load apparatus includes a voltage converter, first and second electric loads, a capacitive element, and abnormal processing means. The voltage converter converts a first DC voltage output from a DC power source to a second DC voltage that is different in voltage level from the first DC voltage. The first and second electric loads are driven by the second DC voltage. The capacitive element smoothes the second DC voltage and supplies the smoothed second DC voltage to the first and second electric loads. When one of the first and second electric loads abnormally stops, the abnormality processing unit stops the other of the first and second electric loads and keeps driving the voltage converter.

Preferably, when the voltage converter abnormally stops, the abnormality processing unit stops the first and second electric loads.

Preferably, when a recovery condition is satisfied, the abnormality processing unit recovers the other of the electric loads.

More preferably, the first electric load includes a motor and a first inverter. The first inverter drives the motor. The second electric load includes a generator and a second inverter. The second inverter drives the generator.

Additionally, according to the present invention, a computer readable recording medium recording a program for causing a computer to execute is a computer readable recording medium recording a program for causing a computer to execute processing of an abnormality in an electric load apparatus.

The electric load apparatus includes a voltage converter, first and second electric loads and a capacitive element. The voltage converter converts a first DC voltage output from a DC power source to a second DC voltage that is different in voltage level from the first DC voltage. The first and second electric loads are driven by the second DC voltage. The capacitive element smoothes the second DC voltage and supplies the smoothed second DC voltage to the first and second electric loads.

The program causes the computer to execute a first step of detecting an abnormality in any of the voltage converter, the first electric load and the second electric load, and a second step of stopping, when one of the first and second electric loads abnormally stops, the other of the first and second electric loads and keeping driving the voltage converter.

Preferably, the first step detects an abnormal stop of the voltage converter, and the second step stops the first and second electric loads.

Preferably, the program further causes the computer to execute a third step of recovering the other of the electric loads when a recovery condition is satisfied.

Preferably, the first electric load includes a motor and a first inverter. The first inverter drives the motor. The second electric load includes a generator and a second inverter. The second inverter drives the generator.

Further, according to the present invention, a method for processing abnormality is a method for processing an abnormality in an electric load apparatus.

The electric load apparatus includes a voltage converter, first and second electric loads and a capacitive element. The voltage converter converts a first DC voltage output from a DC power source to a second DC voltage that is different in voltage level from the first DC voltage. The first and second electric loads are driven by the second DC voltage. The capacitive element smoothes the second DC voltage and supplies the smoothed second DC voltage to the first and second electric loads.

The method for processing an abnormality includes a first step of detecting an abnormality in any of the voltage converter, the first electric load and the second electric load, and a second step of stopping the other of the first and second electric loads and keeping driving the voltage converter, when one of the first and second electric loads abnormally stops.

Preferably, the first step detects an abnormal stop of the voltage converter, and the second step stops the first and second electric loads.

Preferably, the method for processing an abnormality further includes a third step of recovering the other of the electric loads when a recovery condition is satisfied.

Preferably, the first electric load includes a motor and an inverter. The first inverter drives the motor. The second electric load includes a generator and a second inverter. The second inverter drives the generator.

In the present invention, which of the voltage converter, the first electric load and the second electric load that form the electric load apparatus is abnormal is detected, and when one of the first and second electric loads abnormally stops, the other of the electric loads is stopped and the voltage converter is kept driving.

Therefore, according to the present invention, even when one of the first and second electric loads abnormally stops, the voltage between opposing ends of the capacitive element can be prevented from excessively rising or excessively dropping. As a result, the electric load apparatus having two electric loads driven by boosted voltage obtained by boosting DC voltage from the DC power source can be driven safely. Each element constituting the electric load apparatus can be protected.

BRIEF DESCRIPTION OF THE DRAWINGS

FIG. 5 is a conceptual illustration of two motors mounted on a hybrid vehicle.

DETAILED DESCRIPTION OF EMBODIMENTS

Figure 1:
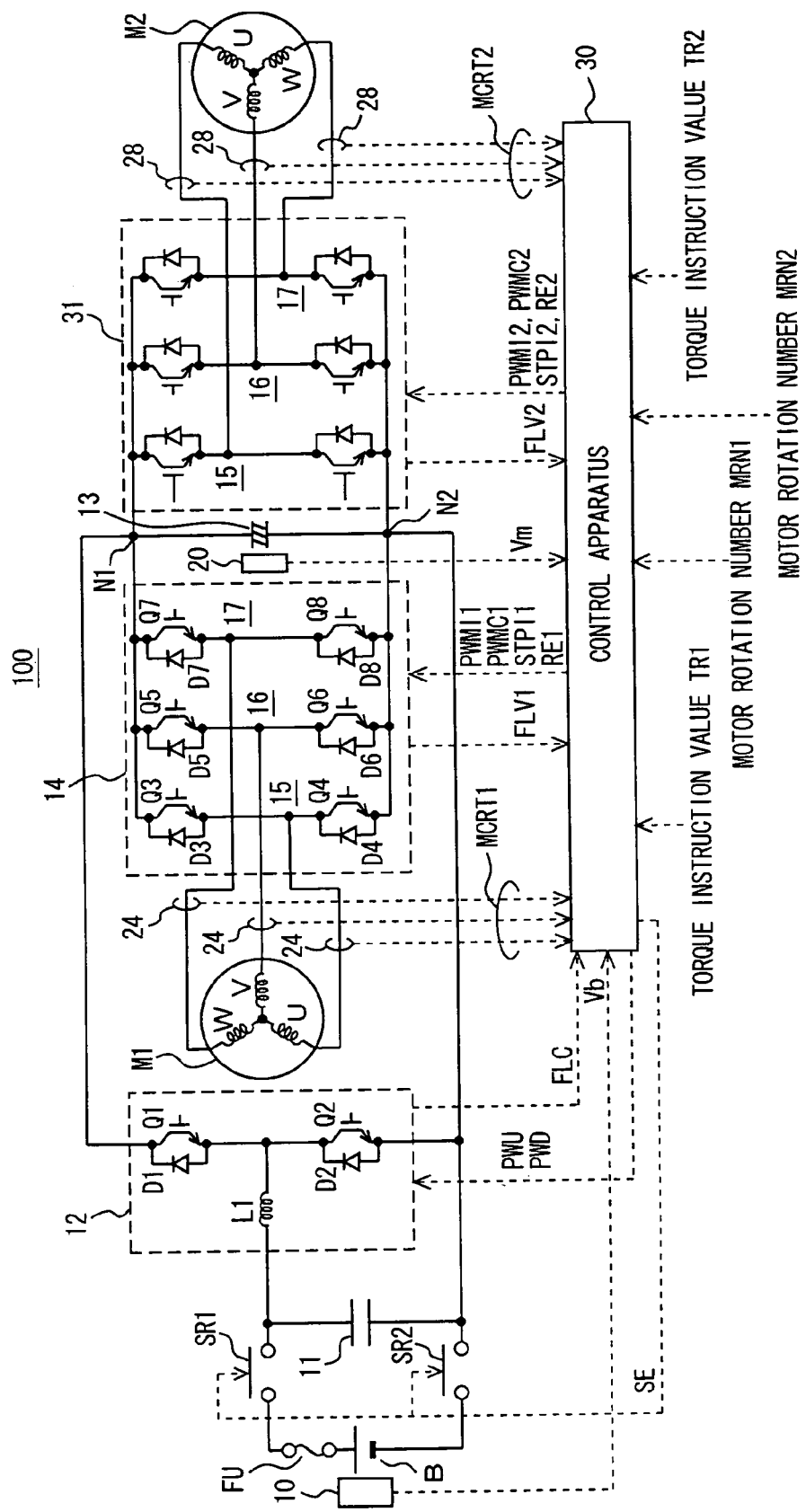
FIG. 1 is a schematic block diagram of an electric load apparatus according to the present invention.

The Embodiment of the present invention will be described in detail referring to the figures. The same or corresponding parts are denoted by the same reference characters, and description thereof will not be repeated.

Referring to FIG. 1, an electric load apparatus 100 according to the embodiment of the present invention includes a DC power source B, a fuse FU, voltage sensors 10 and 20, system relays SR1 and SR2, capacitors 11 and 13, a DC/DC converter 12, inverters 14 and 31, current sensors 24 and 28, a control apparatus 30, and AC motors M1 and M2.

AC motor M1 is mounted on, for example, a hybrid vehicle. AC motor M1 is a drive motor for producing torque for driving the driving wheels of the hybrid vehicle. Further, when AC motor M1 is rotated by the rotation of the driving wheels at deceleration of the vehicle or the like, AC motor M1 serves as a generator (the so-called regeneration function).

AC motor M2 is mounted on, for example, a hybrid vehicle. AC motor M2 is connected to the engine (not shown) of the hybrid vehicle and serves as a generator driven by the engine, and also serves as a motor to the engine, e.g., a motor capable of starting the engine. By attaining control where the engine is kept driving efficiently through the adjustment of electricity generation torque of AC motor M2, fuel economy of the hybrid engine and the exhaust gas thereof can be improved. The driving wheels driven by AC motor M1 may be the wheels on the side where the engine of the hybrid vehicle is mounted (e.g., front wheels when the engine is placed on the front side), or they may be the wheels on the side without the engine (rear wheels when the engine is place on the front side).

DC/DC converter 12 includes a reactor L1, NPN transistors Q1 and Q2, and diodes D1 and D2. One end of reactor L1 is connected to the power supply line of DC power source B, and the other end thereof is connected to an intermediate point between NPN transistor Q1 and NPN transistor Q2, namely, between the emitter of NPN transistor Q1 and the collector of NPN transistor Q2. NPN transistor Q1 and NPN transistor Q2 are serially connected between the power supply line and the earth line. The collector of NPN transistor Q1 is connected to the power supply line, and the emitter of NPN transistor Q2 is connected to the earth line. Between collectors and emitters of NPN transistors Q1 and Q2, diodes D1 and D2 passing current from the emitter side to the collector side are connected, respectively.

Inverter 14 is formed with a U phase arm 15, a V phase arm 16, and a W phase arm 17. U phase arm 15, V phase arm 16, and W phase arm 17 are provided in parallel between the power supply line and the earth line.

U phase arm 15 is formed with serially connected NPN transistors Q3 and Q4, V phase arm 16 is formed with serially connected NPN transistors Q5 and Q6, and W phase arm 17 is formed with serially connected NPN transistors Q7 and Q8. Between the collectors and the emitters of NPN transistors Q3–Q8, diodes D3–D8 for passing current from the emitter side to the collector side are connected, respectively.

The intermediate point of each phase arm is connected to each phase end of each phase coil of AC motor M1. Specifically, AC motor M1 is a three-phase permanent magnet motor, in which each of one ends of three coils U, V, W phase are all connected to the intermediate point, while the other end of U phase coil is connected to the intermediate point of NPN transistors Q3 and Q4, the other end of V phase coil is connected to the intermediate point of NPN transistors Q5 and Q6, and the other end of W phase coil is connected to the intermediate point of NPN transistors Q7 and Q8.

Inverter 31 is structured similarly as inverter 14.

DC power source B is formed with a secondary battery such as a Nickel-Metal Hydride battery and a lithium ion battery. Voltage sensor 10 detects DC voltage Vb output from DC power source B (also referred to as "battery voltage Vb"), and outputs the detected DC voltage Vb to control apparatus 30. Fuse FU is connected between DC power source B and system relays SR1 and SR2. As DC power source B, a fuel cell may also be combined.

System relays SR1 and SR2 are turned on/off by a signal SE from control apparatus 30. More specifically, system relays SR1 and SR2 are turned on by signal SE of H (logical high) level, and turned off by signal SE of L (logical low) level.

Capacitor 11 smoothes DC voltage Vb supplied from DC power source B, and supplies the smoothed DC voltage Vb to DC/DC converter 12.

DC/DC converter 12 boosts DC voltage Vb supplied from capacitor 11 and supplies it to capacitor 13. More specifically, DC/DC converter 12 receives a signal PWU from control apparatus 30, and boosts DC voltage Vb in accordance with a period during which NPN transistor Q2 is turned on by signal PWU, and supplies it to capacitor 13.

When DC/DC converter 12 receives signal PWD from control apparatus 30, it decreases DC voltage supplied from inverter 14 and/or inverter 31 via capacitor 13 to charge DC power source B. It is needless to say that DC/DC converter 12 may be applied to circuitry that only performs the voltage boosting function.

Further, when DC/DC converter 12 is stopped due to failure or the like, an IPM (Intelligent Power Module, not shown) for DC/DC converter 12 outputs a fail signal FLC to control apparatus 30.

Capacitor 13 smoothes DC voltage from DC/DC converter 12, and supplies the smoothed DC voltage to inverters 14 and 31 via nodes N1 and N2. Voltage sensor 20 detects voltage between both ends of capacitor 13, i.e., output voltage Vm of DC/DC converter 12 (corresponding to input voltage of inverter 14: the same holds true for the following), and outputs the detected output voltage Vm to control apparatus 30.

When supplied with DC voltage from capacitor 13, inverter 14 converts DC voltage to AC voltage based on a signal PWMI1 from control apparatus 30 to drive AC motor M1. Thus, AC motor M1 is driven to produce the torque specified by a torque instruction value TR1.

Further, at the regenerative braking of the hybrid vehicle equipped with electric load apparatus 100, inverter 14 converts AC voltage generated by AC motor M1 to DC voltage based on a signal PWMC1 from control apparatus 30, and supplies the converted DC voltage to DC/DC converter 12 via capacitor 13. As used herein, the regenerative braking includes a braking operation associated with the regeneration of electricity where the driver of the hybrid vehicle operates a foot brake, or deceleration (or stopping acceleration) of the vehicle associated with regeneration of electricity where the driver does not operate the foot brake but turns an accelerator pedal off.

Still further, IPM (not shown) for inverter 14 outputs a fail signal FLV1 to control apparatus 30 when inverter 14 is stopped due to failure or the like.

Still further, inverter 14 stops its operation upon receiving a stop signal STPI1 from control apparatus 30.

Still further, inverter 14 recovers its operation upon receiving a signal RE1 from control apparatus 30.

When supplied with DC voltage from capacitor 13, inverter 31 converts DC voltage to AC voltage based on a signal PWMI2 from control apparatus 30 to drive AC motor M2. Thus, AC motor M2 is driven to produce the torque specified by a torque instruction value TR2.

Further, at the regenerative braking of the hybrid vehicle equipped with electric load apparatus 100, inverter 31 converts AC voltage generated by AC motor M2 to DC voltage based on a signal PWMC2 from control apparatus 30, and supplies the converted DC voltage to DC/DC converter 12 via capacitor 13.

Still further, IPM (not shown) for inverter 31 outputs a fail signal FLV2 to control apparatus 30 when inverter 31 is stopped due to failure or the like.

Still further, inverter 31 stops its operation upon receiving a stop signal STPI2 from control apparatus 30.

Still further, inverter 31 recovers its operation upon receiving a signal RE2 from control apparatus 30.

Current sensor 24 detects motor current MCRT1 flowing through AC motor M1, and outputs the detected motor current MCRT1 to control apparatus 30. Current sensor 28 detects motor current MCRT2 flowing through AC motor M2, and outputs the detected motor current MCRT2 to control apparatus 30.

In FIG. 1, while current sensor 24 is provided to each of U phase, V phase and W phase of AC motor M1, the present invention is not limited thereto, and current sensor 24 may be provided to at least two of U phase, V phase and W phase. Similarly, current sensor 28 may be provided to at least two of U phase, V phase and W phase.

Control apparatus 30 receives DC voltage Vb output from DC power source B from voltage sensor 10, motor current MCRT1 and MCRT2 from current sensors 24 and 28, respectively, output voltage Vm of DC/DC converter 12 (i.e., input voltage to inverters 14 and 31) from voltage sensor 20, torque instruction values TR1 and TR2 and motor rotation numbers MRN1 and MRN 2 from external ECU (Electrical Control Unit), and fail signals FLC, FLV1 and FLV2 from DC/DC converter 12 and IPMs for inverters 14 and 31, respectively. Then, based on DC voltage Vb, output voltage Vm, motor current MCRT1, torque instruction value TR1, and motor rotation number MRN1, control apparatus 30 generates signal PWMI1 for switching-control NPN transistors Q3–Q8 of inverter 14 when inverter 14 drives AC motor M1 through a method described later, and outputs the generated signal PWMI1 to inverter 14.

Further, based on DC voltage Vb, output voltage Vm, motor current MCRT2, torque instruction value TR2, and motor rotation number MRN2, control apparatus 30 generates signal PWMI2 for switching-control NPN transistors Q3–Q8 of inverter 31 when inverter 31 drives AC motor M2 through a method described later, and outputs the generated signal PWMI2 to inverter 31.

Further, when inverter 14 (or 31) drives AC motor M1 (or M2), control apparatus 30 generates signal PWU for switching-control NPN transistors Q1 and Q2 of DC/DC converter 12 through a method described later, based on DC voltage Vb, output voltage Vm, motor current MCRT1 (or MCRT2), torque instruction value TR1 (or TR2), and motor rotation number MRN1 (or MRN2), and outputs the generated signal PWU to DC/DC converter 12.

Further, control apparatus 30 generates signal PWMC1 for converting the AC voltage generated by AC motor M1 at regenerative braking to DC voltage, or signal PWMC2 for converting AC voltage generated by AC motor M2 to DC voltage, and outputs the generated signal PWMC 1 or signal PWMC2 to inverter 14 or inverter 31, respectively. In this case, control apparatus 30 generates signal PWD for controlling DC/DC converter 12 to decrease DC voltage from inverter 14 or 31 to charge DC power source B, and outputs it to DC/DC converter 12.

Still further, when an abnormality occurs in any of DC/DC converter 12 and inverters 14 and 31, control apparatus 30 processes the occurred abnormality through a method described later based on fail signals FLC, FLV1, and FLV2 and output voltage Vm.

Still further, control apparatus 30 generates signal SE for turning on/off system relays SR1 and SR2, and outputs it to system relays SR1 and SR2.

Figure 2:
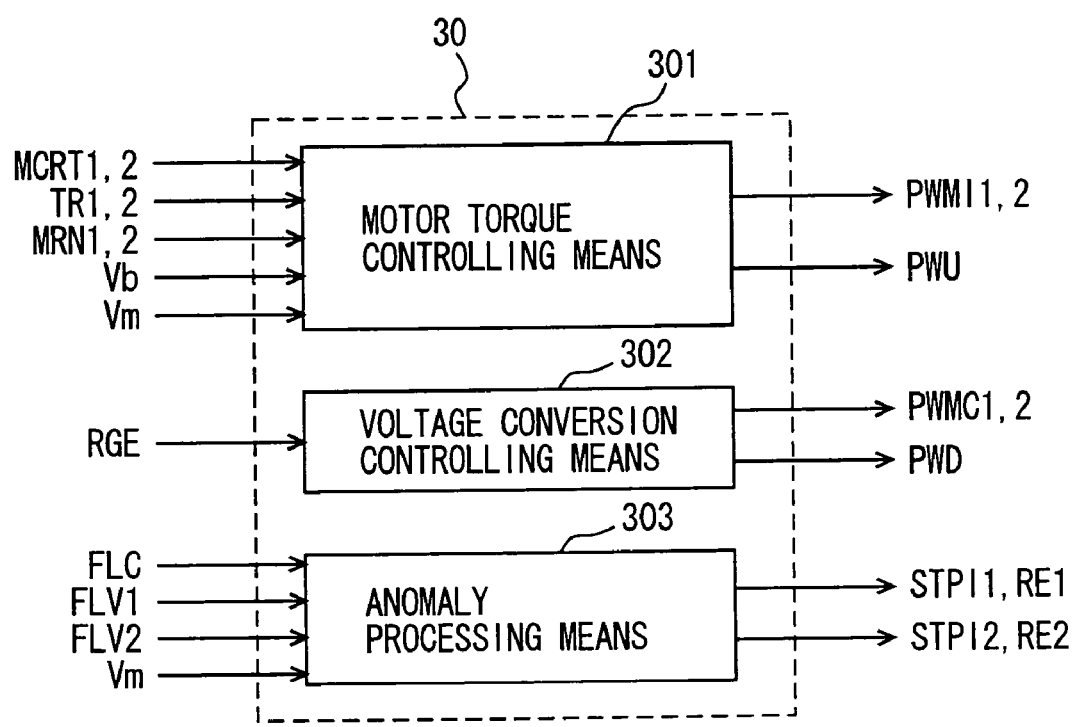
FIG. 2 is a functional block diagram of a control apparatus shown in FIG. 1.

FIG. 2 is a functional block diagram of control apparatus 30. Referring to FIG. 2, control apparatus 30 includes motor torque controlling means 301, voltage conversion controlling means 302 and abnormality processing means 303.

Motor torque controlling means 301 generates signals PWMI1 and PWMI2 based on motor current MCRT1 and MCRT2, torque instruction values TR1 and TR2, motor rotation numbers MRN1 and MRN2, DC voltage Vb, and output voltage Vm, and outputs the generated signals PWMI1 and PWMI2 to inverters 14 and 31, respectively.

Further, motor torque controlling means 301 generates signal PWU based on DC voltage Vb, output voltage Vm, motor current MCRT1 (or MCRT2), torque instruction value TR1 (or TR2), motor rotation numbers MRN1 (or MRN2), and outputs the generated signal PWU to DC/DC converter 12.

When voltage conversion controlling means 302 receives signal RGE indicating that the hybrid vehicle equipped with electric load apparatus 100 enters the regenerative braking mode from external ECU, it generates signals PWMC1 and PWMC2 and signal PWD, and outputs the generated signals PWMC1 and PWMC2 to inverters 14 and 31, respectively, and outputs signal PWD to DC/DC converter 12.

Abnormality processing means 303 receives fail signal FLC from IPM for DC/DC converter 12, and receives fail signal FLV1 from IPM for inverter 14, and receives fail signal FLV2 from IPM for inverter 31.

Then, abnormality processing means 303 determines whether DC/DC converter 12 is abnormally stopped based on fail signal FLC. Additionally, abnormality processing means 303 determines whether inverter 14 is abnormally stopped based on fail signal FLV1. Further, abnormality processing means 303 determines whether inverter 31 is abnormally stopped based on fail signal FLV2.

When abnormal processing means 303 determines that DC/DC converter 12 is abnormally stopped, it generates stop signals STPI1 and STPI2 for forcefully stopping inverters 14 and 31, and outputs the generated stop signals STPI1 and STPI2 to inverters 14 and 31, respectively.

When abnormality processing means 303 determines that inverter 14 is abnormally stopped while DC/DC converter 12 is not abnormally stopped, it generates stop signal STPI2 for forcefully stopping inverter 31, and outputs the generated stop signal STPI2 to inverter 31. Then, after outputting stop signal STPI2 to inverter 31, abnormality processing means 303 determines whether the voltage level of output voltage Vm from voltage sensor 20 is stable or not, and when the voltage level of output voltage Vm is stable, it generates signal RE2 for recovering inverter 31 and outputs it to inverter 31.

Further, when abnormality processing means 303 determines that inverter 31 is abnormally stopped while DC/DC converter 12 and inverter 14 are not abnormally stopped, it generates stop signal STPI1 for forcefully stopping inverter 14, and outputs the generated stop signal STPI1 to inverter 14. Then, after outputting stop signal STPI1 to inverter 14, abnormality processing means 303 determines whether the voltage level of output voltage Vm from voltage sensor 20 is stable or not, and when the voltage level of output voltage Vm is stable, it generates signal RE1 for recovering inverter 14 and outputs it to inverter 14.

Figure 3:
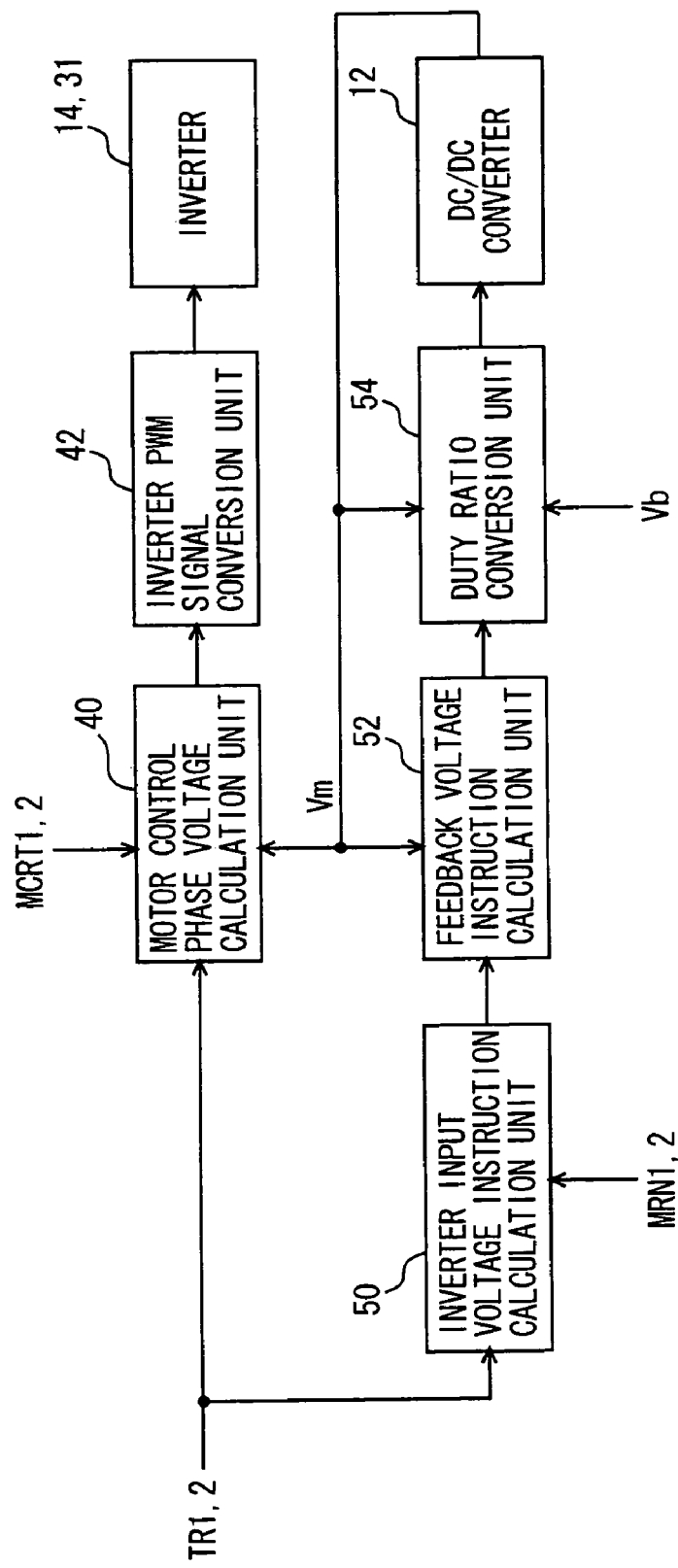
FIG. 3 is a functional block diagram for illustrating functions of a motor torque controlling means shown in FIG. 2.

FIG. 3 is a functional block diagram of motor torque controlling means 301. Referring to FIG. 3, motor torque controlling means 301 includes a motor control phase voltage calculation unit 40, an inverter PWM signal conversion unit 42, an inverter input voltage instruction calculation unit 50, a feedback voltage instruction calculation unit 52, and a duty ratio conversion unit 54.

Motor control phase voltage calculation unit 40 calculates the voltage to be applied to the coil of each phase of AC motor M1 based on output voltage Vm of DC/DC converter 12, motor current MCRT1, and torque instruction value TR1, and calculates the voltage to be applied to the coil of each phase of AC motor M2 based on output voltage Vm, motor current MCRT2, and torque instruction value TR2. Then, motor control phase voltage calculation unit 40 outputs the calculated voltage for AC motor M1 or M2 to inverter PWM signal conversion unit 42.

When inverter PWM signal conversion unit 42 receives the voltage for AC motor M1 from motor control phase voltage calculation unit 40, it generates signal PWMI1 based on the received voltage and outputs it to inverter 14. Additionally, when inverter PWM signal conversion unit 42 receives the voltage for AC motor M2 from motor control phase voltage calculation unit 40, it generates signal PWMI2 based on the received voltage and outputs it to inverter 31.

Inverter input voltage instruction calculation unit 50 calculates voltage instruction Vdccom based on torque instruction value TR1 and motor rotation number MRN1 (or torque instruction value TR2 and motor rotation number MRN2), and outputs the calculated voltage instruction Vdccom to feedback voltage instruction calculation unit 52.

Feedback voltage instruction calculation unit 52 calculates feedback voltage instruction Vdccom_fb based on output voltage Vm of DC/DC converter 12 from voltage sensor 20 and voltage instruction Vdccom from inverter input voltage instruction calculation unit 50, and outputs the calculated feedback voltage instruction Vdccom_fb to duty ratio conversion unit 54.

Duty ratio conversion unit 54 calculates duty ratio for setting output voltage Vm from voltage sensor 20 to feedback voltage instruction Vdccom_fb from feedback voltage instruction calculation unit 52 based on battery voltage Vb from voltage sensor 10, output voltage Vm from voltage sensor 20, and feedback voltage instruction Vdccom_fb from feedback voltage instruction calculation unit 52, and generates signal PWU for turning on/off NPN transistors Q1 and Q2 of DC/DC converter 12 based on the calculated duty ratio. Then, duty ratio conversion unit 54 outputs the generated signal PWU to NPN transistors Q1 and Q2 of DC/DC converter 12.

It should be noted that, if the on-duty of lower NPN transistor Q2 of DC/DC converter 12 is increased, then the electricity storage of reactor L1 increases, and hence output of higher voltage can be obtained. On the other hand, if the on-duty of upper NPN transistor Q1 is increased, then the voltage of the power supply line decreases. Accordingly, by controlling the duty ratio of NPN transistors Q1 and Q2, the voltage of the power supply line can be controlled to any voltage at least at the output voltage of DC power source B.

Figure 4:
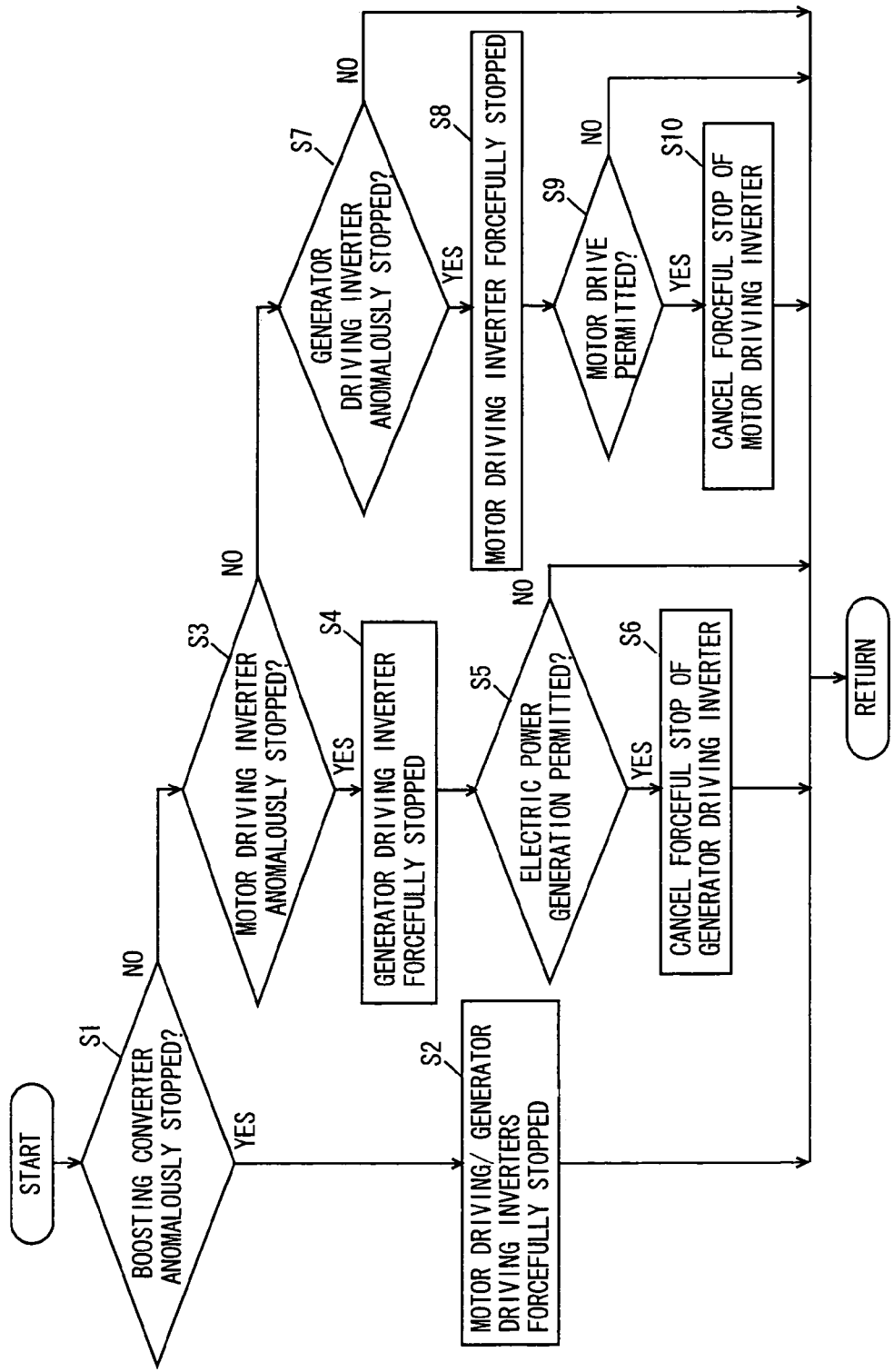
FIG. 4 is a flowchart for illustrating the operation of processing an abnormality in the electric load apparatus shown in FIG. 1.

Referring to FIG. 4, an abnormality processing operation in abnormal processing means 303 is described. In the description of FIG. 4, it is assumed that inverter 14 drives AC motor M1 as a drive motor, and inverter 31 drives AC motor M2 as a generator.

When the abnormality processing operation is started, abnormality processing means 303 determines whether DC/DC converter 12 is abnormally stopped based on fail signal FLC from IPM for DC/DC converter 12 (step S1). Then, when abnormality processing means 303 determines that DC/DC converter 12 is abnormally stopped, it generates stop signals STPI1 and STPI2, and outputs the generated stop signal STPI1 to inverter 14 and outputs the generated stop signal STPI2 to inverter 31. Thus, inverter 14 driving the drive motor (AC motor M1) and inverter 31 driving the generator (AC motor M2) are forcefully stopped (step S2).

The reason for stopping inverters 14 and 31 when DC/DC converter 12 is abnormally stopped is as follows. When DC/DC converter 12 is stopped, if an electric power consumption amount in AC motor M1 exceeds an electric power generation amount in AC motor M2, voltage Vm between both ends of capacitor 13 abruptly decreases, and large current flows from DC power source B to capacitor 13 side vial diode D1 of DC/DC converter 12. This may cause fuse FU to blow, or the lives of elements inside DC/DC converter 12 may be shortened due to the large current. Additionally, when such a problem is solved by increasing the current-withstanding performance of the elements for protecting DC/DC converter 12 from such a large current, the system cannot be realized at low costs.

Additionally, when DC/DC converter 12 is stopped, if the electric power consumption amount in AC motor M1 is lower than the electric power generation amount in AC motor M2, voltage Vm between both ends of capacitor 13 abruptly increases. In this case, as switching loss in inverter 31 increases if current flows through inverter 31, the temperature of inverter 31 may rise, or the lives of elements inside inverter 31 may be shortened. Measures against such problems cannot be taken excessively for realizing the system at lost costs.

Accordingly, it is contemplated to forcefully stop inverters 14 and 31 when DC/DC converter 12 is abnormally stopped such that fuse FU or DC/DC converter 12 may be protected even when voltage Vm between both ends of capacitor 13 decreases, and that inverter 31 may be protected even when voltage Vm between both ends of capacitor 13 increases.

At step S1, if it is determined that DC/DC converter 12 is not abnormally stopped, abnormality processing means 303 determines whether inverter 14 is abnormally stopped based on fail signal FLV1 from IPM for inverter 14 (step S3). If it is determined that inverter 14 is abnormally stopped, then abnormality processing means 303 generates stop signal STPI2 and outputs the generated stop signal STPI2 to inverter 31. Thus, inverter 31 driving the generator (AC motor M2) is forcefully stopped (step S4). In this case, DC/DC converter 12 is kept driving.

The reason for forcefully stopping inverter 31 driving the generator (AC motor M2) when inverter 14 is abnormally stopped is as follows. If inverter 31 is kept driving when inverter 14 is abnormally stopped, then the generation operation in the generator (AC motor M2) is continued, and therefore, the consumption amount of DC power stored in capacitor 13 decreases and voltage Vm between both ends of capacitor 13 abruptly increases. Then, in this case, as switching loss in inverter 31 increases if current flows through inverter 31, the life of inverter 31 may be shortened.

Accordingly, it is contemplated to forcefully stop inverter 31 in order to prevent the life of inverter 31 from shortened by the increased voltage Vm between both ends of capacitor 13.

The reason for keeping driving DC/DC converter 12 when inverter 31 is forcefully stopped is to prevent voltage Vm between both ends of capacitor 13 from increasing during the time period from abnormally stop of inverter 14 until forceful stop of inverter 31 by driving DC/DC converter 12 to regenerate the electric power generated by AC motor M2 to DC power source B.

After step S4, when a predetermined time period elapses, abnormality processing means 303 determines whether electric power generation is permitted based on the voltage level of output voltage Vm from voltage sensor 20 (step S5). When the voltage level of output voltage Vm is not stable at step S5, abnormality processing means 303 determines that electric power generation is not permitted, and the series of operations terminates.

On the other hand, when the voltage level of output voltage Vm is stable at step S5, abnormality processing means 303 determines that electric power generation is permitted, and generates a signal RE2 and outputs it to inverter 31. This cancels the forceful stop of inverter 31 (step S6). Then the series of operations terminates.

The reason for canceling the forceful stop of inverter 31 to permit electric power generation by AC motor M2 when output voltage Vm is stable is because the electric power generated by AC motor M2 can be supplied for driving auxiliary equipment connected to DC power source B without inviting switching loss in inverter 31 as discussed above if the voltage level of output voltage Vm is stable.

At step S3, when it is determined that inverter 14 is not abnormally stopped, abnormality processing means 303 determines whether inverter 31 is abnormally stopped based on fail signal FLV2 from IPM for inverter 31 (step S7). Then, when inverter 31 is not abnormally stopped, the series of operations terminates.

At step S7, when it is determined that inverter 31 is abnormally stopped, abnormality processing means 303 generates stop signal STPI1 and outputs it to inverter 14. Thus, inverter 14 driving the drive motor (AC motor M1) is forcefully stopped (step S8). In this case, DC/DC converter 12 is kept driving.

The reason for forcefully stopping inverter 14 when inverter 31 is abnormally stopped is as follows. Even when electric power is not supplied from the generator (AC motor M2) to capacitor 13, AC motor M1 consumes the electric power stored in capacitor 13. Therefore, if inverter 14 is not stopped, voltage Vm between both ends of capacitor 13 abruptly decreases and large current flows from DC power source B to capacitor 13 side via diode D1 of DC/DC converter 12. Then, fuse FU blows or the life of DC/DC converter 12 is shortened affected by the large current.

Accordingly, in order to protect fuse FU or DC/DC converter 12 from the effect of decreasing voltage Vm between both ends of capacitor 13, it is contemplated to forcefully stop inverter 14.

After step S8, when a predetermined time period elapses, abnormality processing means 303 determines whether driving of inverter 14 driving the drive motor (AC motor M1) is permitted, based on the voltage level of output voltage Vm from voltage sensor 20 (step S9). When the voltage level of output voltage Vm is not stable, abnormality processing means 303 determines that driving of inverter 14 is not permitted, and the series of operations terminates.

At step S9, when the voltage level of output voltage Vm is stable, abnormality processing means 303 determines that driving of inverter 14 is permitted, and generates a signal RE1 and outputs it to inverter 14. This cancels the forceful stop of inverter 14 driving the drive motor (AC motor M1) (step S1). Then the series of operations terminates.

The reason for canceling the forceful stop of inverter 14 for driving AC motor M1 when output voltage Vm is stable is because AC motor M1 can be driven by DC power stored in capacitor 13 if the voltage level of output voltage Vm is stable.

As discussed above, abnormality processing means 303 detects which of DC/DC converter 12, inverters 14 and 31 of electric load apparatus 100 is abnormal and performs processing corresponding to the cause of the detected abnormality, and thus safely drives electric load apparatus 100.

While it has been discussed that determination of whether inverter 14 driving the drive motor (AC motor M1) is abnormally stopped is made prior to determination of whether inverter 31 driving the generator (AC motor M2) is abnormally stopped, the determinations may be made in the reverse order in the present invention.

Referring again to FIG. 1, the total operation in electric load apparatus 100 is described. When the total operation is started, control apparatus 30 generates signal SE of H level and outputs it to system relays SR1 and SR2, whereby system relays SR1 and SR2 are turned on. DC power source B outputs DC voltage to DC/DC converter 12 via system relays SR1 and SR2.

Voltage sensor 10 detects DC voltage Vb output from DC power source B, and outputs the detected DC voltage Vb to control apparatus 30. Further, voltage sensor 20 detects voltage Vm between both ends of capacitor 13, and outputs the detected voltage Vm to control apparatus 30. Further, current sensor 24 detects motor current MCRT1 flowing through AC motor M1 and outputs it to control apparatus 30, while current sensor 28 detects motor current MCRT2 flowing through AC motor M2 and outputs it to control apparatus 30. Then, control apparatus 30 receives torque instruction values TR1 and TR2 and motor rotation numbers MRN1 and MRN2 from external ECU.

Then, control apparatus 30 generates signal PWMI1 through the method as discussed above based on DC voltage Vb, output voltage Vm, motor current MCRT1, torque instruction value TR1 and motor rotation number MRN1, and outputs the generated signal PWMI1 to inverter 14. Further, control apparatus 30 generates signal PWMI2 through the method as discussed above based on DC voltage Vb, output voltage Vm, motor current MCRT2, torque instruction value TR2 and motor rotation number MRN2, and outputs the generated signal PWMI2 to inverter 31.

Further, when inverter 14 (or 31) drives AC motor M1 (or M2), control apparatus 30 generates signal PWU for switching-control NPN transistors Q1 and Q2 of DC/DC converter 12 through the method described above based on DC voltage Vb, output voltage Vm, motor current MCRT1 (or MCRT2), torque instruction value TR1 (or TR2) and motor rotation number MRN1 (or MRN2), and outputs the generated signal PWU to DC/DC converter 12.

Then, DC/DC converter 12 boosts DC voltage Vb from DC power source B in response to signal PWU, and supplies the increased DC voltage to capacitor 13 through nodes N1 and N2. Then, inverter 14 converts the DC voltage smoothed by capacitor 13 to AC voltage based on signal PWMI1 from control apparatus 30 and drives AC motor M1. Inverter 31 converts the DC voltage smoothed by capacitor 13 to AC voltage based on signal PWMI2 from control apparatus 30 and drives AC motor M2. Thus, AC motor M1 produces torque specified by torque instruction value TR1 and AC motor M2 produces torque specified by torque instruction value TR2.

At regenerative braking of the hybrid vehicle equipped with electric load apparatus 100, control apparatus 30 receives signal RGE from external ECU and generates signals PWMC1 and PWMC2 in response to the received signal RGE and outputs them to inverters 14 and 31, respectively, and generates signal PWD and outputs it to DC/DC converter 12.

Then, inverter 14 converts AC voltage generated by AC motor M1 to DC voltage in response to signal PWMC 1, and supplies the converted DC voltage to DC/DC converter 12 via capacitor 13. Further, inverter 31 converts AC voltage generated by AC motor M2 to DC voltage in response to signal PWMC2, and supplies the converted DC voltage to DC/DC converter 12 via capacitor 13. Then, DC/DC converter 12 receives DC voltage from capacitor 13 via nodes N1 and N2, and decreases the received DC voltage based on signal PWD, and supplies the decreased DC voltage to DC power source B. Thus, DC power source B is charged by the electric power generated by AC motor M1 or M2.

When AC motor M1 is consuming DC power stored in capacitor 13 and AC motor M2 is generating electric power, control apparatus 30 receives fail signals FLC, FLV1, and FLV2 from IPM for DC/DC converter 12, IPM for inverter 14 and IPM for inverter 31, respectively, and receives output voltage Vm from voltage sensor 20. Then, control apparatus 30 detects which of DC/DC converter 12, inverters 14 and 31 is abnormally stopped following the flowchart of FIG. 4, and performs processing corresponding to the cause of the detected abnormality.

While it has been described that AC motor M1 is a drive motor and AC motor M2 is a generator, AC motor M1 may be a generator and AC motor M2 may be a drive motor in the present invention.

Inverter 14 and AC motor M1 constitute "a first electric load", while inverter 31 and AC motor M2 constitute "a second electric load".

Further, determining that the voltage level of output voltage Vm is stable (see step S5 in FIG. 4) after inverter 31 is forcefully stopped (see step S4 in FIG. 4) corresponds to satisfaction of the recovery condition of inverter 31.

Still further, determining that the voltage level of output voltage Vm is stable (see step S9 in FIG. 4) after inverter 14 is forcefully stopped (see step S8 in FIG. 4) corresponds to satisfaction of the recovery condition of inverter 14.

Still further, the method for processing an abnormality according to the present invention is the method for processing an abnormality in electric load apparatus 100 following the flowchart of FIG. 4.

Still further, the abnormality processing in control apparatus 303 is practically performed by CPU. CPU reads a program including steps of the flowchart of FIG. 4 from ROM and executes the read program to process abnormality in electric load apparatus 100 following the flowchart of FIG. 4. Accordingly, ROM corresponds to the computer (CPU) readable recording medium recording the program including steps of the flowchart of FIG. 4.

Still further, while electric load apparatus 100 has been described to be mounted on a hybrid vehicle, the electric load apparatus according to the present invention is not limited to the one applied to a hybrid vehicle, and it may be applied to others. For example, the electric load apparatus according to the present invention is applicable to an electric vehicle or a fuel cell vehicle, and to a system including a DC/DC converter and a plurality of electric loads other than a vehicle.

It is clearly understood that the embodiment disclosed hereinabove is by way of illustration and example only and is not to be taken by way of limitation. The scope of the present invention is limited only by the scope of the claims and not by the description of the embodiment. It is intended that all modifications in equivalent terms to the claims and within the scope of the claims are included.

The present invention is applicable to an electric load apparatus including two AC motors driven by boosted voltage obtained by boosting DC voltage, and capable of processing a detected abnormality.

The invention claimed is:

1. An electric load apparatus, comprising:
    a voltage converter converting a first DC voltage output from a DC power source to a second DC voltage that is different in voltage level from said first DC voltage;
    first and second electric loads driven by said second DC voltage;
    a capacitive element smoothing said second DC voltage and supplying the smoothed second DC voltage to said first and second electric loads; and
    an abnormality processing unit, when an abnormality occurs in one of said first and second electric loads, the abnormality processing unit stopping the other of said first and second electric loads and permitting said voltage converter to continue operating.

2. The electric load apparatus according to claim 1, wherein
    when an abnormality occurs in said voltage converter, said an abnormality processing unit stops said first and second electric loads.

3. The electric load apparatus according to claim 1, wherein
    when a recovery condition is satisfied, said abnormality processing unit permits said other of the electric loads to operate.

4. The electric load apparatus according to claim 1, wherein
    said first electric load includes
    a motor and
    a first inverter driving said motor, and
    said second electric load includes
    a generator and
    a second inverter driving said generator.

5. A computer readable recording medium recording a program for causing a computer to execute processing of an abnormality in an electric load apparatus; wherein
    said electric load apparatus includes
    a voltage converter converting a first DC voltage output from a DC power source to a second DC voltage that is different in voltage level from said first DC voltage,
    first and second electric loads driven by said second DC voltage, and
    a capacitive element smoothing said second DC voltage and supplying the smoothed second DC voltage to said first and second electric loads, and wherein
    said program causes the computer to execute
    a first step of detecting an abnormality in any of said voltage converter, said first electric load and said second electric load, and
    a second step of stopping the other of said first and second electric loads, when an abnormality occurs in one of said first and second electric loads, and permitting said voltage converter to continue operating.

6. The computer readable recording medium recording a program for causing a computer to execute according to claim 5, wherein
    said first step detects an abnormality of said voltage converter, and
    said second step stops said first and second electric loads.

7. The computer readable recording medium recording a program for causing a computer to execute according to claim 5, wherein
    said program further causes the computer to execute a third step of permitting said other of the electric loads to operate when a recovery condition is satisfied.

8. The computer readable recording medium recording a program for causing a computer to execute according to claim 5, wherein
    said first electric load includes
    a motor and
    a first inverter driving said motor, and
    said second electric load includes
    a generator and
    a second inverter driving said generator.

9. A method for processing an abnormality in an electric load apparatus, wherein
    said electric load apparatus includes:
    a voltage converter converting a first DC voltage output from a DC power source to a second DC voltage that is different in voltage level from said first DC voltage,
    first and second electric loads driven by said second DC voltage, and
    a capacitive element smoothing said second DC voltage and supplying the smoothed second DC voltage to said first and second electric loads, and wherein
    said method for processing an abnormality includes:
    a first step of detecting an abnormality in any of said voltage converter, said first electric load and said second electric load, and
    a second step of stopping the other of said first and second electric loads, when an abnormality occurs in one of said first and second electric loads, and permitting said voltage converter to continue operating.

10. The method for processing an abnormality according to claim 9, wherein
    said first step detects an abnormality of said voltage converter, and
    said second step stops said first and second electric loads.

11. The method for processing an abnormality according to claim 9, further comprising
    a third step of permitting said other of the electric loads to operate when a recovery condition is satisfied.

12. The method for processing an abnormality according to claim 9, wherein
    said first electric load includes
    a motor and
    a first inverter driving said motor, and
    said second electric load includes
    a generator and
    a second inverter driving said generator.

* * * * *